United States Patent [19]
Olapinski et al.

[11] Patent Number: 5,454,947
[45] Date of Patent: Oct. 3, 1995

[54] CERAMIC FILTER ELEMENT FOR TANGENTIAL FLOW FILTRATION OF LIQUIDS AND GASES

[75] Inventors: Hans Olapinski, Aichwald; Winfried Michell, Reichenbach; Manfred Kielwein, Börtlingen; Hans-Erich Simmich, Wernau; Helmut Ziegelbauer, Plochingen, all of Germany

[73] Assignee: Cerasiv GmbH Innovatives Keramik-Engineering, Plochingen, Germany

[21] Appl. No.: 211,853

[22] PCT Filed: Oct. 14, 1992

[86] PCT No.: PCT/EP92/02372

§ 371 Date: Apr. 15, 1994

§ 102(e) Date: Apr. 15, 1994

[87] PCT Pub. No.: WO93/07959

PCT Pub. Date: Apr. 29, 1993

[30] Foreign Application Priority Data

Oct. 16, 1991 [DE] Germany .............. 41 34 223.2

[51] Int. Cl.$^6$ .................................. B01D 24/00
[52] U.S. Cl. .................. 210/510.1; 210/500.26; 210/504; 210/506; 55/523
[58] Field of Search ............ 210/490, 500.26, 210/503, 504, 506, 510.1; 55/523; 422/180; 428/116

[56] References Cited

U.S. PATENT DOCUMENTS

| | | | |
|---|---|---|---|
| 4,233,351 | 11/1980 | Okumura et al. | 428/116 |
| 4,383,974 | 5/1983 | Fratzer et al. | 422/180 |
| 4,694,749 | 2/1987 | Miura | 55/523 |
| 4,894,160 | 1/1990 | Abe et al. | 55/523 |
| 4,902,319 | 2/1990 | Kato et al. | 55/523 |
| 5,104,546 | 4/1992 | Filson et al. | 210/651 |

FOREIGN PATENT DOCUMENTS 1557899  12/1979  United Kingdom.

OTHER PUBLICATIONS

"Microporous Alumina Membranes", Hsie et al., Journal of Membrane Science, 39 (1988) 221–241.

*Primary Examiner*—Robert A. Dawson
*Assistant Examiner*—Ana M. Fortuna
*Attorney, Agent, or Firm*—Felfe & Lynch

[57] ABSTRACT

A filter element intended for tangential-flow filtration has an elongated support body of porous ceramic material with coaxial channels running through the support body and provided on their surface with a ceramic membrane having a calibrated pore structure. A portion of the fluid flowing through the channels penetrates the membrane and exits as filtrate at the circumferential surface of the support body. The shape of the outwardly facing channel wall is adapted to the external shape of the support body and there it has a uniformly thick wall corresponding to the mechanical stress. The shape of the channel walls is configured such that the webs remaining between the channels flare outwardly wedge-wise. The filter element thus configured has a support body with a reduced resistance to the passage of the filtrate flowing through it.

21 Claims, 5 Drawing Sheets

CERAMIC FILTER ELEMENT FOR TANGENTIAL FLOW FILTRATION OF LIQUIDS AND GASES

BACKGROUND OF THE INVENTION

The invention relates to a ceramic filter element for tangential flow filtration of liquids and gases where the filter element has an elongated support body of a porous ceramic material, at least two-coaxial channels running through the support body with at least one ceramic membrane on the surface of the channels.

Ceramic membrane filters have proven their worth especially in hydroeconomy and in the beverage industry for the filtration of beer, wine and fruit juices in which tangential flow (cross-flow) filtration enjoys preference in continuous processes. With this application, called "dynamic filtration," suspensions can be filtered without clogging the membrane. The liquid to be filtered is not forced directly through the membrane but made to flow past the surface of the membrane with an appropriately high velocity of flow ranging from 2 to 7 meters per second, while only a part of the liquid stream passes through the membrane as filtrate (permeate). The dogging of the membrane, i.e., the formation of a filter cake on the membrane, is prevented by the fact that, due to its high velocity of flow and the microturbulences occurring at the membrane surface, the suspension constantly flushes away the particles held on the membrane surface.

Ceramic filters for tangential flow filtration, such as those known, for example, from DE-A-35 19 620, have combined layers of different porosity and defined pore size. The thin top membrane layer performs the separating function, and the coarse ceramic layer beneath it serves as a supporting layer. Filter elements are said therein to be especially effective which in general have an elongated, cylindrical form of the supporting layer structure, referred to hereinafter as the "support body", with a plurality of bores extending through the support body and with a very thin ceramic membrane applied to its surface as the separating means.

Filter elements with a plurality of coaxial cylindrical channels through which only unfiltrate flows have proven their worth in the beverage industry. The filtrate penetrating through the membrane surface of the channels flows through the support body under pressure and exits at its circumferential surface. The disadvantage of these known multichannel filter elements lies in the low rate of flow of the filtrate through them. Particularly the inner channels contribute little to the performance of the filter, although they have a comparatively large portion of the membrane surface. Experiments have shown that the support body itself has a non-negligible resistance. A test of this kind is given as an example further below.

THE INVENTION

Figure 1:
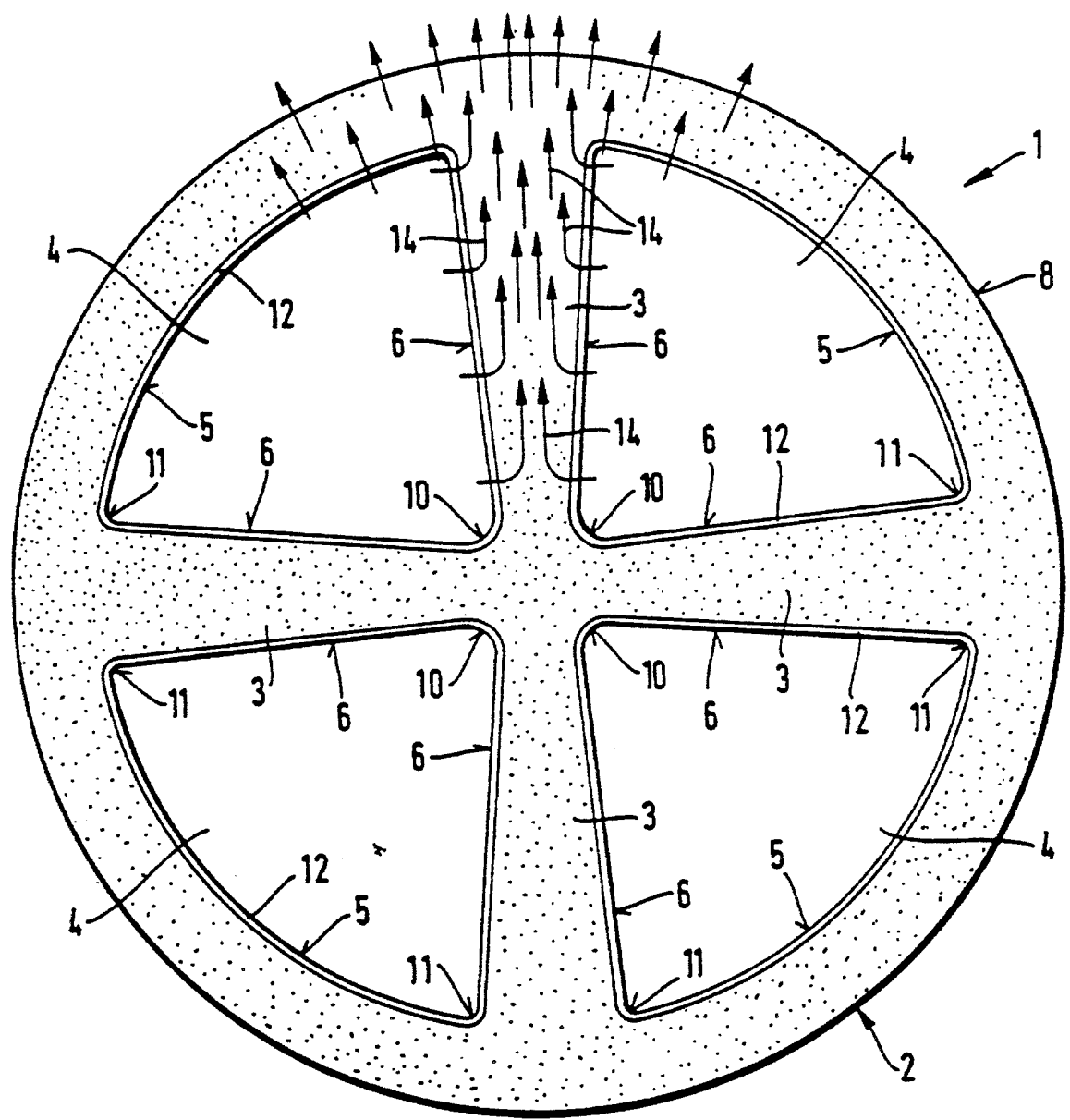
FIG. 1 shows a cross section through a ceramic filter element of a preferred embodiment of the invention.

An object of the present invention is to provide an improved ceramic filter element for the tangential-flow filtration of liquids and gases which has a support body offering reduced resistance to permeation so as to obtain a higher rate of permeation the filtrate at the same difference in pressure between the unfiltrate and the exiting filtrate.

The above stated object is obtained in accordance with the invention in that channels are arranged coaxially about an imaginary central axis of the support body, while, as seen in cross section, the contour of the outwardly facing channel wall is adapted to the external contour of the support body, so that the support body here has a uniform thickness, a wall thickness corresponding to the mechanical stress, and the contour of the other walls of the channel is configured such that the webs remaining between the channels flare outwardly wedge-like, the width of these webs increasing to a maximum of 3 times the thinnest wall thickness.

The solution according to the invention is based on the recognition that the filtrate flow, i.e., the filtrate uniformly penetrating through the membrane surface at an equal pressure potential at all points, increases constantly on its way out through the support body. The resistance to penetration is also kept low even on longer courses through the support body, since the webs remaining between the channels increase in width according to the filtrate flow. The outwardly facing channel wall of the peripheral channels are adapted to the external contour of the support body, thereby providing the shortest course of the filtrate through the support body. On account of their favorable channel geometry, with the conditions of flow improved over the state of the art, the ceramic filter elements thus configured provide conditions better than the state of the art and a rate of penetration of the filtrate increased by as much as 30%, In comparison with filter elements having a plurality of channels in the form of cylindrical bores.

The present invention is especially suitable in the case of microfiltration, wherein the elongated support body is of polygonal cross section or in the form of a cylinder, and especially has on a dividing circle at least 2, and preferably at least 3 segment-shaped channels adapted to the outer contour. The result is comparatively large channel cross sections for a high rate of flow of the unfiltrate and a high filtration rate through an appropriately coarse-pored membrane ceramic.

An especially advantageous embodiment of the invention provides that the webs remaining on the support body between the channels flare wedge-wise outwardly in steps, such that to the first wedge angle α1 a second wedge angle α2 is added, and so on. The contour of the channel walls, which defines the wall remaining between two adjacent channels, can have a curvature with continuously greater angles of increase α if there are a sufficient number of steps. Thus, more unfiltrate can be passed through the filter element for the same velocity of flow and a larger channel cross section. The filtrate produced in great amounts through the relatively coarse membrane passes through the thin wall of the outer support body wall as well as the wedge-shaped webs with little pressure loss, from the interior of the support body to the circumferential surface of the filter element where it can be captured by a suitable apparatus.

In another preferred embodiment of the invention, the webs, as seen from the middle of the support body, at first extend with a uniform width, before they flare wedge-wise outwardly. The straight section of the webs can amount preferably to half of the web length. In the case of a minimum width of the webs, i.e., a minimum wall thickness of the support body ceramic, a maximum channel cross section is obtained toward the center.

An embodiment of the invention that is especially advantageous for ultrafiltration provides that the filter element has an elongated support body of square or hexagonal cross section which is occupied by a plurality of channels, similar to a honeycomb structure. The honeycomb channel structure has an extremely large membrane surface and thus permits an economical filtrate throughput. Because a membrane suitable for ultrafiltration has extremely small pores with a pore diameter ranging from 1 nm to 100 nm. Here, again, the filtrate must penetrate through the support body from the inside out, while according to the invention a wedge-shaped flow path is created by the fact that the channel cross-sectional areas diminish from the inside out and the remaining webs flare outwardly step by step, so that the resistance of the support body to penetration is reduced.

The ceramic filter element 1 shown in FIG. 1 can be used in the beverage industry for microfiltration. A cylindrical support body is extruded from ceramic material is shown with four coaxially disposed channels 4.

The support body 2, consisting of a massive, coarse ceramic structure of $\alpha$-$Al_2O_3$ with an average pore size of 15 µm at a porosity of 40%, may have a length of about 850 mm and a diameter of about 32 min.

The surfaces of the channels 4 have formed thereon a ceramic membrane 12 of $\alpha$-$Al_2O_3$ with an average pore size of 0.5 µm at a porosity of 35%. The thickness of the membrane 12 is between 5 and 20 µm.

The filter element 1 has at its ends gaskets (not shown). At the entry and exit of the unfiltrate the open pores of the support body ceramic are closed by filling them with a plastic composition for a length of a few millimeters. Equipped with end caps/seals, the filter element 1 is installed in a filtration circuit, so that the unfiltrate can flow only through the channels and a portion of this fluid passes as filtrate through the thin membrane coating 12. The filtrate thus separated from the unfiltrate flows through the porous support body 2 and exits at its external contour 8, where it is collected by the appropriate apparatus, known to those in the art.

The four channels 4 arrayed symmetrically about the central axis of the support body 2 are each surrounded by three channel walls, while the contour, as seen in cross section, of the outwardly facing arcuate wall 5 is adapted to the external contour 8 of the support body 2 so that there is a uniform wall thickness through which the filtrate can exit on the shortest path. The thickness of the wall depends upon the mechanical stress exerted the support body 2.

The two channel walls 6 extend such that the web 3 of the support body 2 remaining between two channels 4 flares outwardly in a wedge shape. From the narrowest point, i.e., at the point adjacent to the center axis, where the web has the least width, where the contour of the channel walls 6 converges with the radius 10, to the widest point on the transition radius 11, the width of the web 3 doubles. The radii 10 and transition radii 11 are desirable for manufacturing and hydrodynamic reasons.

The arrows 14 indicate how the imaginary lines of flow of the filtrate become denser from the inside out and encounter a greater amount of space for their exit. By this means according to the invention it has been possible to reduce the support body resistance by as much as 30% in comparison with those with webs that do not flare outwardly.

Figure 2:
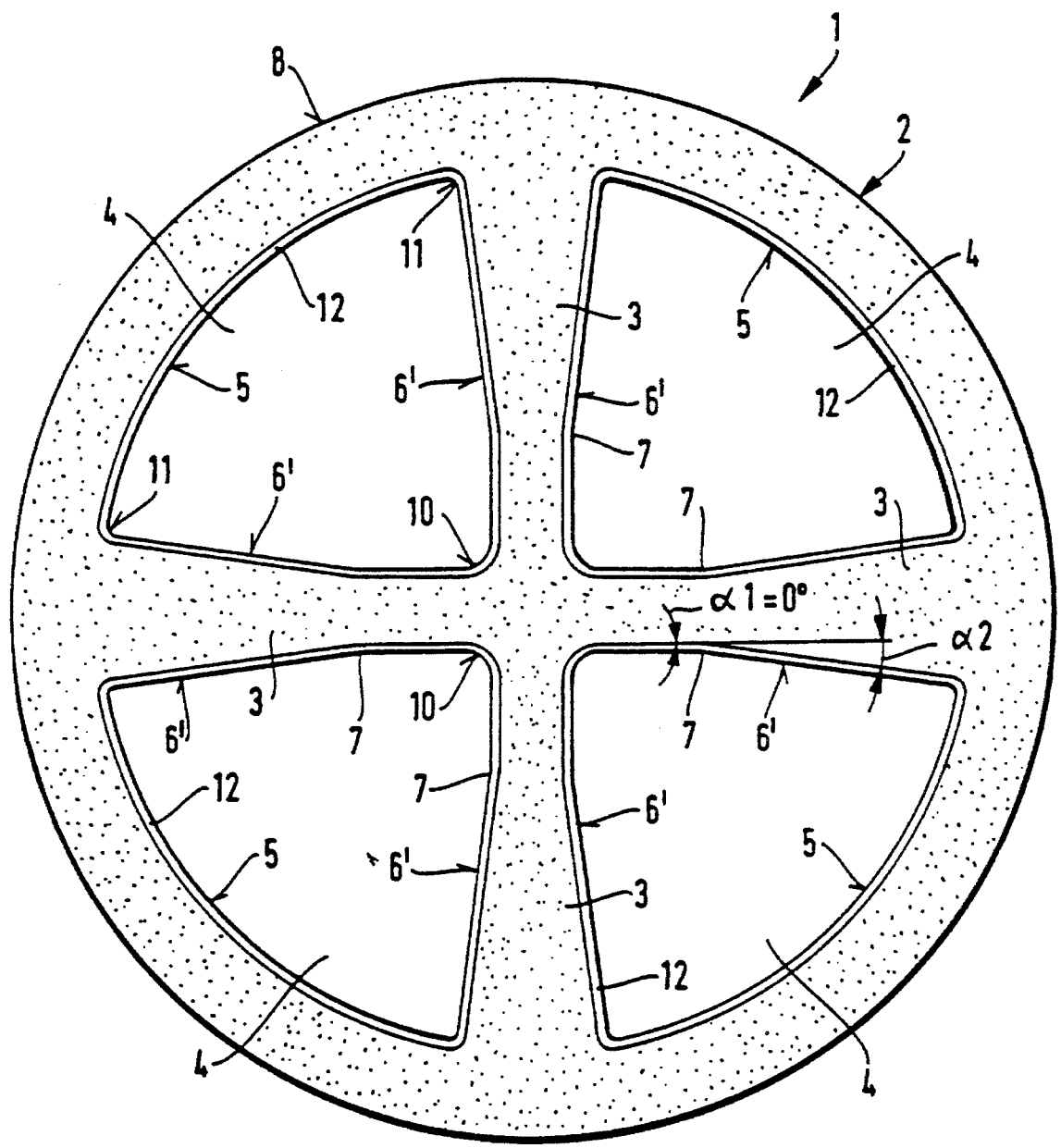
FIGS. 2, 3 and 4 each illustrate cross sections of alternate embodiments of the invention.

FIG. 2 shows another desirable channel configuration, which permits a greater flow cross section.

The channels 4 differ in shape from those in FIG. 1, in that the webs 3, as seen from the center of the circular filter element 1, are at first straight with a uniform web width, while the straight web section corresponds to one-third of the web length. This is followed by two thirds of web section starting from a step transition 7, so that the web flares outwardly at the wedge angle $\alpha 2$. The channel wall can be graded by additional wedge angles. By definition, a wedge angle $\alpha 1=0$ degrees corresponds to a straight, non-flaring web section. The result of the gradated shape of the contour of the channel walls 6', which is not limited to Just one step transition is that, in comparison with channels of rectilinear channel walls, as shown in FIG. 1, the cross section of the channels 4 is greater toward the center of the support body, while preserving a minimum wall thickness of the support body partitions.

Figure 3:
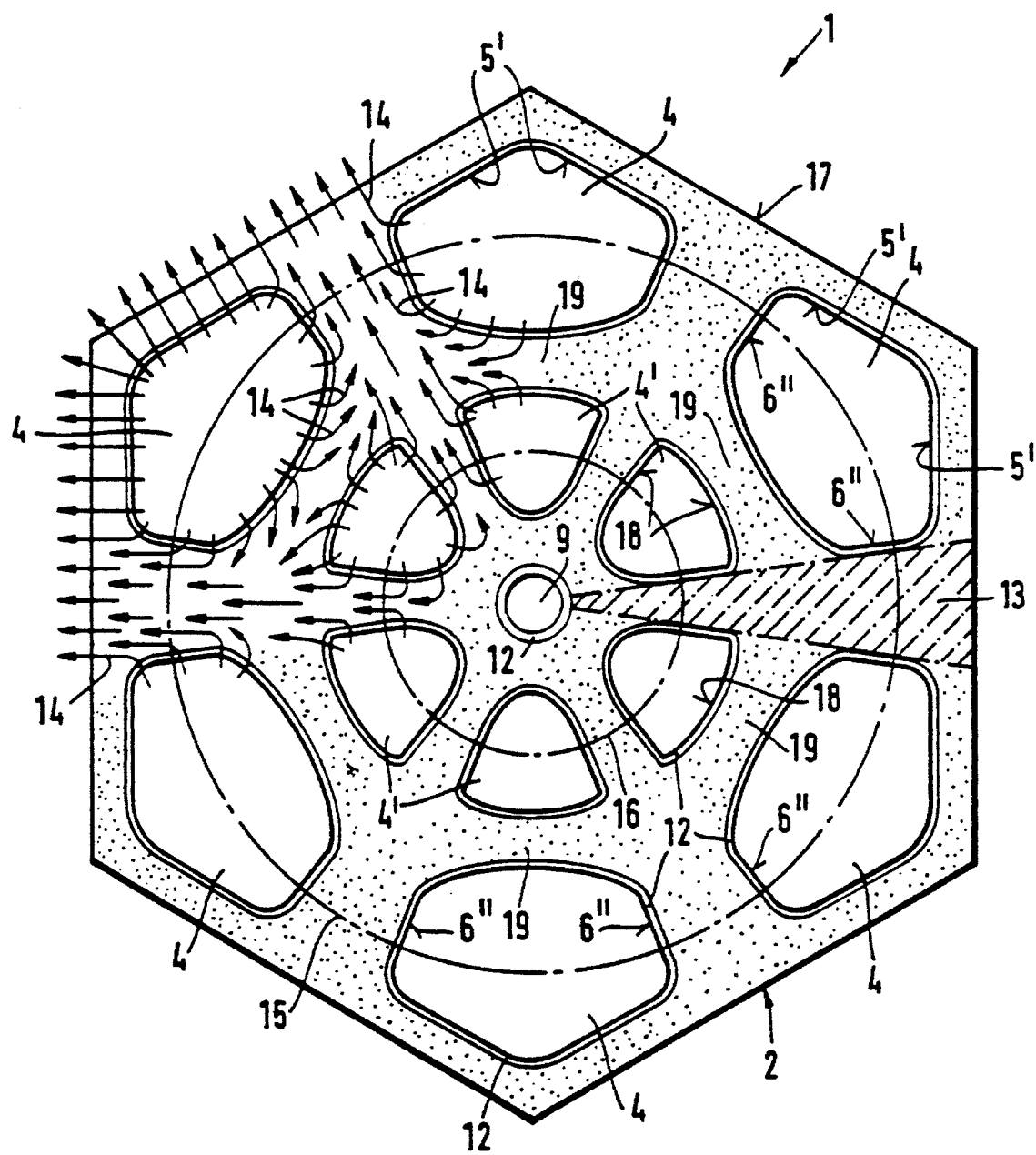

An enlargement of the membrane surface is obtained if, as in FIG. 3, the channels 4, 4' running through the support body are arranged on two dividing circles 15 and 16. Filter element 1 of FIG. 3 is of a hexagonal cross section and has on its outer dividing circle 15 six channels 4 with the contour of the channel wall 5' adapted to the external contour 17. The contour of the channel walls 6" follows the wedge-shaped flow path 13 indicated by hatching. The six channels 4' arranged on the inner dividing circle 16 have a contour 18. Contour 18 is adapted on the one hand to the wedge-shaped flow path 13. Contour 18 forms with the contour of the channels 4 disposed on the dividing circle 15 a web 19 flaring toward the sides.

An additional cylindrical passage 9 runs through the central axis of the support body 2. The middle channel 9 is of no special significance as regards filtration; instead, it prevents accumulation of matter in the center of the support body 1 which would be harmful in the sintering process, and thereby cracks and rejections can be avoided.

Figure 4:
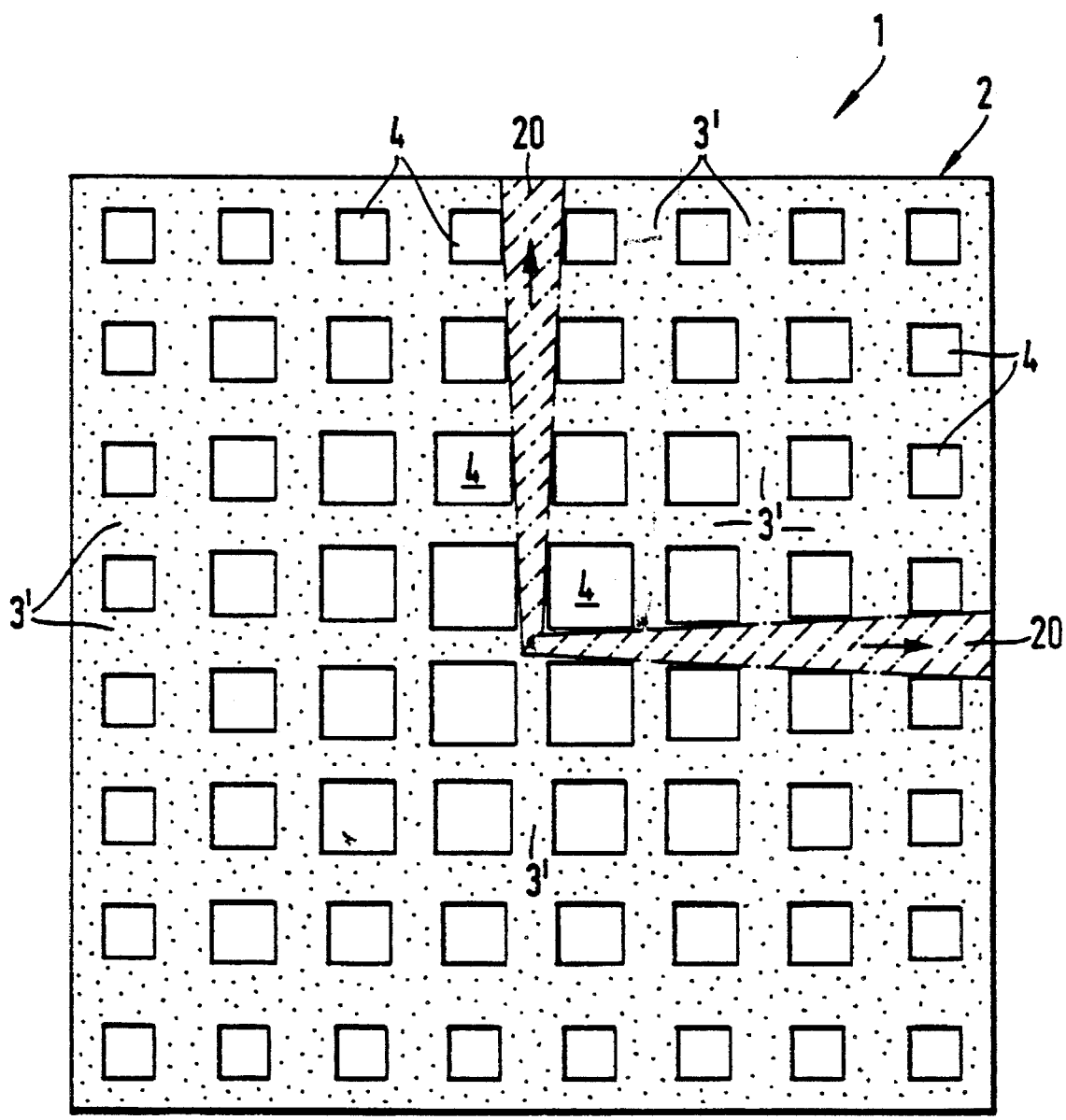

In ultrafiltration, a membrane surface area must be very large in proportion to the volume of the support body in order to achieve an economical throughput. For this purpose filter elements with a honeycomb structure, as shown in FIG. 4, are appropriate. The square filter element 1 has a plurality of likewise square channels 4 which, as in all other embodiments, run longitudinally through the filter element. The cross-sectional area of the channels 4 decreases from the inside out, so that, as shown in exaggeration in FIG. 4, the webs 3' of the support body 2 widen outwardly. Here, again, a wedge-shaped flow path 20 composed of many step-like gradations is the result.

The following example shows flow measurements made on a commercial ceramic multi-channel filter element.

Figure 5:
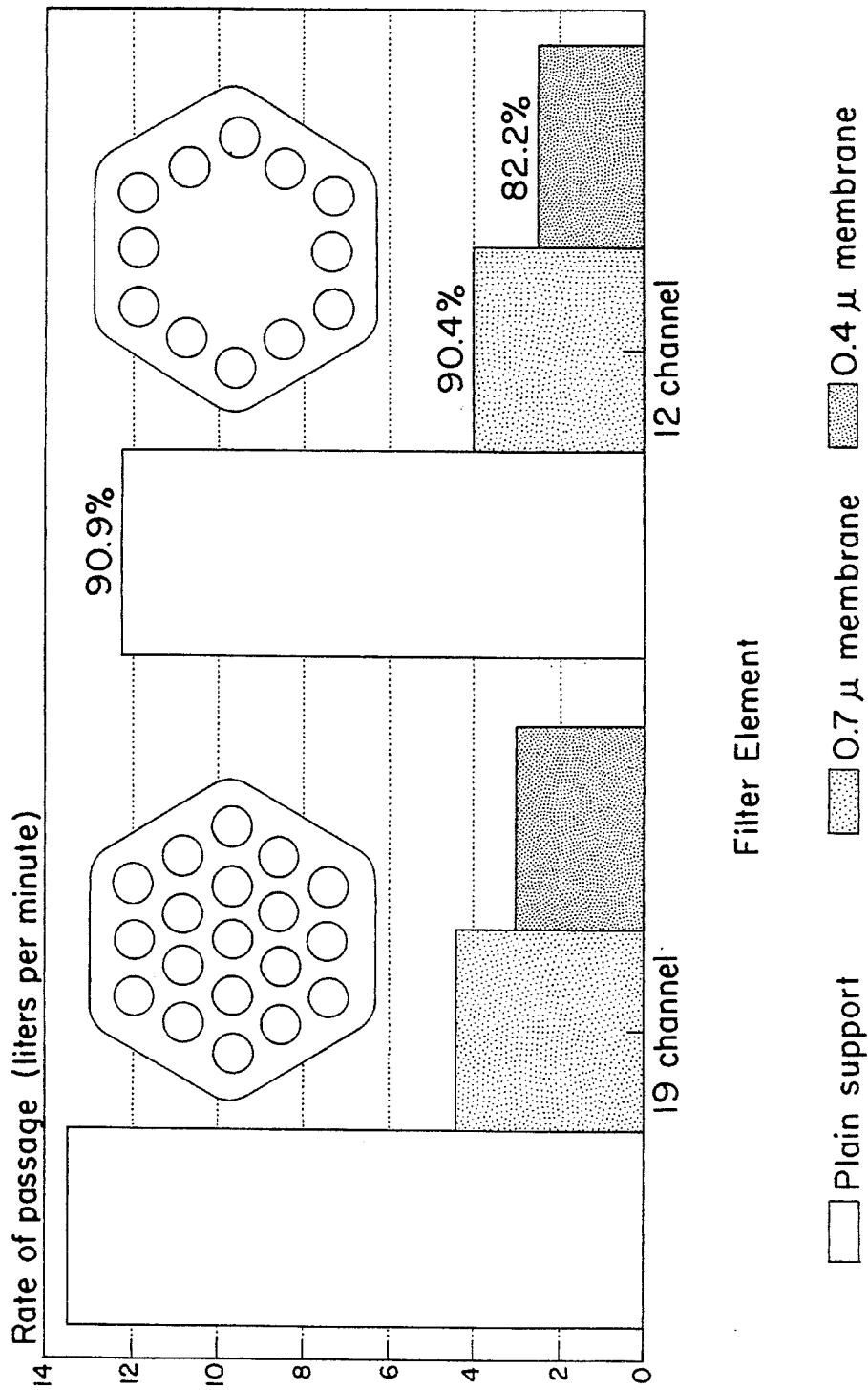
FIG. 5 is a bar graph comparing the rates of flow through a commercial multi-channel filter element with 19 channels and 12 channels.

In the bar graph of FIG. 5, three flow rates are compared. The two filter elements under comparison for permeation measurement differ only in the number of the channels, which are all of cylindrical shape and have the same diameter. With the left filter element, which has nineteen channels, three flow rates are achieved at a specific system pressure, each of them corresponding to 100%. The channels of its support body are either without a membrane, or coated with a membrane of a pore size of 0.7 µm or of a pore size of 0.4 µm. For the right-hand filter element with 12 peripherally arranged channels, the three corresponding bars show the percentage by which the permeation rate diminishes.

This study shows that the support body itself exercises an appreciable resistance to the permeation of the filtrate through the support body. The inner channels, which amount to more than ⅓ of the total channel surface or membrane surface, contribute, in the case of a support body with no membrane and one with a membrane up to a fineness of even 0.7 µm, to the filter performance by only about 10%.

We claim:

1. A ceramic filter element comprising an elongated support body of porous ceramic material having a central longitudinal axis and an outer contour, the support body having at least two channels extending through the support body and disposed coaxially about the longitudinal axis, each channel having at least one ceramic membrane applied thereto and an outwardly facing channel wall adapted to the outer contour of the support body so that the support body has a wall of substantially uniform thickness between the outwardly facing channel wall and the support body outer contour, said at least two channels having a wall between adjacent channels, said channel wall including a web having a flare and forming a wedge with a thinnest section and a thickest section, the width ratio of the wedge thickest section to the wedge thinnest section of the web being up to 3:1.

2. The filter element of claim 1 wherein the ceramic material has an average pore diameter of 3 to 20μ.

3. The filter element of claim 1 wherein the membrane is a multiple layer membrane.

4. The filter element of claim 1 wherein the substantially uniformly thick wall is of a thickness sufficient to withstand the mechanical stress in operation.

5. The filter element of claim 1 wherein the elongated support body has a polygonal cross section or is the shape of a cylinder.

6. The filter element of claim 5 wherein said channels are arranged on one or more dividing circles with at least 3 channels being arranged on each of the one or more dividing circles.

7. The filter element of claim 5 wherein said least two channels are arranged on one or more dividing circles with at least 2 channels being arranged on a dividing circle.

8. The filter element of claim 1 wherein the channels are segment shaped.

9. The filter element of claim 1 wherein the webs of the support body flare wedge-wise outwardly with at least one step transition so that the contour of the channel wall is graded in steps, and defined by a first wedge angle α1 and at least a second wedge angle α2.

10. The filter element of claim 9 wherein the channel wall is graded with additional wedge angles.

11. The filter element of claim 1 wherein the channel wall between two adjacent channels has a length and a substantially uniform width up to no more than half of the length and the channel wall expands wedge-wise outwardly for the remainder of its length so that the channel wall is graded in at least one step with the first wedge angle being α1=0.

12. The filter element of claim 1 wherein the webs of the support body flare outward continuously, so that the contour of the channel walls has a continuously increasing curvature.

13. The filter element of claim 1 wherein the channels have radii or other continuous transitional shapes at the points where two channel walls meet.

14. The filter element of claim 1 wherein the support body further comprises a cylindrical channel which runs through the longitudinal central axis of the support body.

15. The filter element of claim 1 wherein the elongated support body has a hexagonal cross section and a plurality of hexagonal channels, the channel cross-section areas decreasing from the longitudinal central axis to the outer contour and the webs flare outwardly following a wedge-shaped contour in step gradations.

16. The filter element of claim 1 wherein the support body is of α-$Al_2O_3$.

17. The filter element of claim 16 wherein the ceramic membrane is of α-$Al_2O_3$.

18. The filter element of claim 17 wherein the membrane has a thickness of 5 to 20μ and an average pore size of 0.5μ.

19. The filter element of claim 17 wherein the membrane has pores having a pore diameter of 1 to 100 nm.

20. A device for the tangential flow filtration of liquids or gases comprising the ceramic filter element of claim 1.

21. The filter element of claim 1, wherein the at least two channels are square cross sections having a plurality of square channels spaced therebetween, having a cross sectional area extending longitudinally through said support, the channels cross sectional areas decreasing from the longitudinal central axis of the support to the outer contour, and the web flares outwardly following a flow path in step gradations.

* * * * *